June 19, 1956 R. W. ARMSTRONG 2,751,530
DIFFERENTIAL PRESSURE SENSING UNIT
Filed Jan. 4, 1954
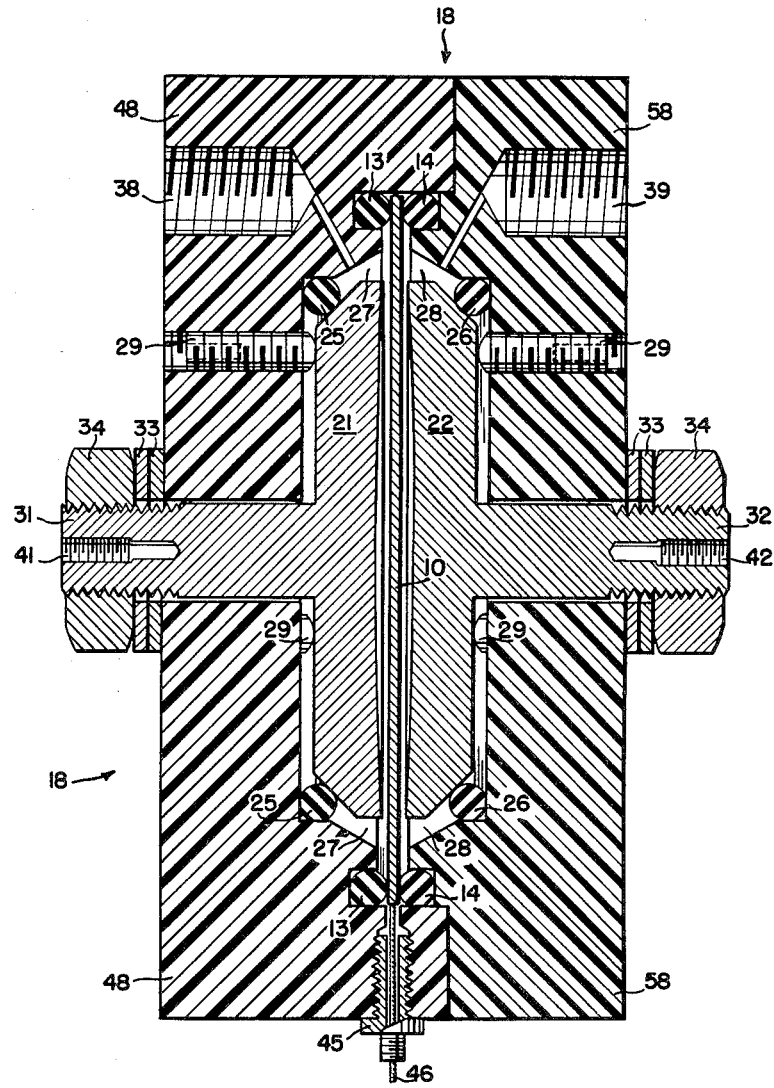
INVENTOR.
ROBERT W. ARMSTRONG
BY George H Fisher
ATTORNEY

United States Patent Office 2,751,530
Patented June 19, 1956

2,751,530
DIFFERENTIAL PRESSURE SENSING UNIT

Robert W. Armstrong, Orono Township, Hennepin County, Minn., assignor to Minneapolis-Honeywell Regulator Company, Minneapolis, Minn., a corporation of Delaware Application January 4, 1954, Serial No. 402,084

2 Claims. (Cl. 317—246)

This invention relates to differential pressure sensing units and more particularly to a pressure sensing unit utilizing a diaphragm as the sensor.

One embodiment of my invention has a circular diaphragm held between two elastic O-rings at its periphery. The O-rings are held in this position by a casing which together with the diaphragm forms two pressure chambers. A capacitor type pickoff is used as a means for sensing deflection. Two capacitor plates, one on each side of the diaphragm, form a double capacitor, the diaphragm being a common plate. A differential of pressure between the two pressure chambers causes a deflection of the diaphragm with a resultant change of the relative capacity of the two halves of the double capacitor. This can be used as an indicating means or as a signal for a control means.

The usual way of mounting a diaphragm and a sensing unit is to rigidly clamp the diaphragm at its periphery. Some of the undesirable results that are inherent in this type of mounting are: necessity for the diaphragm to stretch upon deflection resulting in stresses building up in the diaphragm, difficulty in acquiring the desired sensitivity due to the required stretching and a propensity to vibrate due to the stresses built up in the diaphragm.

My invention eliminates these undesirable characteristics by mounting such a diaphragm between O-rings, so that upon deflection of the diaphragm there is no stretching necessary with no resultant stresses building up in the diaphragm. A sensing unit with a flat diaphragm mounted between O-rings as in my invention has five times the sensitivity as a unit with the same diaphragm rigidly clamped at the periphery. The sensing unit of my invention has dampening qualities due to the mounting of the diaphragm between O-rings.

My invention can readily be utilized as a side slip sensor in an aircraft, a constant altitude controller, or a constant air speed controller. My invention can be used in many other applications especially where a differential pressure sensing unit with the aforementioned qualities is needed.

Therefore an object of my invention is to provide a pressure sensing unit that has much greater sensitivity than sensing units now available.

Another object of my invention is to eliminate stretching of the diaphragm and the resultant stresses that ordinarily build up in the diaphragm.

Still another object of my invention is to provide a pressure sensing unit with dampening qualities an integral part of the sensor.

Yet another object of my invention is to provide a pressure sensing unit equally sensitive and operable in either direction.

Other objects and advantages of my invention will in part be obvious and in part be described when the following specification is read in conjunction with the drawing in which the single figure is a cross section through a diameter of one preferred embodiment of my invention using a capacitor type pickoff.

Referring now to the drawing, a movable diaphragm 10 is mounted between O-rings 13 and 14 in a casing 18. The two halves of the casing 10 are formed to provide a T-shaped annular slot with the resilient O-rings fitting in the wings of the T-shaped annular slot which engage each O-ring on three sides. On opposite sides of this diaphragm 10 are two members 21 and 22 with the face of the members adjacent to the diaphragm 10 of concave configuration. Two O-rings 25 and 26 between the casing 18 and the members 21 and 22 form a pressure seal and define pressure chambers 27 and 28. Pressure chamber 27 is formed between member 21, casing 18, diaphragm 10, and sealed between member 21 and casing 18 by O-ring 25, and sealed between casing 18 and diaphragm 10 by O-ring 13. Pressure chamber 28 is formed in a like manner by diaphragm 10, casing 18, member 22, O-ring 14 and O-ring 26. Members 21 and 22 bear against a plurality of set screws 29 threaded in the casing 18. Members 21 and 22 have extensions 31 and 32 which protrude through the casing 18. Washers 33 and nuts 34 on the threaded ends of extensions 31 and 32 draw the members 21 and 22 up against the adjustable abutments 29. O-rings 25 and 26 have sufficient elasticity to allow any necessary adjustments of set screws 29 to position members 21 and 22 and still maintain the seal between members 21 and 22 and the casing 18.

Pressure is admitted on opposite sides of diaphragm 10 to pressure chambers 27 and 28 through pressure connections 38 and 39. The diaphragm 10 is held between O-rings 13 and 14 and as a differential pressure is applied to the diaphragm 10 the diaphragm will move toward one or the other of members 21 and 22. The mounting between O-rings 13 and 14 permits the diaphragm 10 also to move inward radially in response to the differential pressure. Members 21 and 22 along with the diaphragm 10 form a double capacitor with the diaphragm 10 being the common capacitor plate with the members 21 and 22 being the other capacitor plates. Extensions 31 and 32 of members 21 and 22 are provided with tapped holes 41 and 42 to provide a means of electrical connection to capacitor plates 21 and 22. A connector 45 is placed in casing 18 to allow an electrical connection 46 to be made with the movable diaphragm 10. Casing 18 is of an insulating material and for ease of manufacture can be made of two sections 48 and 58 in which case machine screws, not shown, may be used to hold the casing together. When a differential pressure is applied to movable diaphragm 10 it will deflect towards one of the capacitor plates 21 or 22 with a resultant change in the relative capacity of the two halves of the double capacitor. A change in relative capacity will be proportional to the differential pressure and can be used for either indicating or controlling purposes.

The diaphragm 10 may be continuously subjected to a pressure differential on opposite sides and the means used to mount it is critical if leakage is to be avoided. The T-shaped annular slot used is desirable in that it holds the O-rings positively in place while insuring a tight pressure seal between each of the pressure chambers and the atmosphere outside the casing, and still allows electrical connection to the diaphragm.

It will be readily apparent that in accordance with my invention many changes may be made in details of construction and arrangement of the parts. For example, the invention may also be readily adapted to other types of pickoff well known to the art other than the capacitive type as shown and described here. The scope of my invention is accordingly defined by the appended claims.

I claim as my invention:

1. A differential pressure sensing unit consisting of a diaphragm, two O-rings engaging said diaphragm on opposite surfaces adjacent the periphery of said diaphragm, a casing in which said O-rings and said diaphragm are mounted, said casing having a T-shaped annular slot for holding said O-rings, said O-rings fitting in the wings of said T-shaped annular slot with said diaphragm extending through the stem of said T-shaped annular slot and clamped between said O-rings, said casing having pressure connections to permit application of pressures to chambers on opposite sides of said diaphragm, two capacitor plates one on each side of said diaphragm, said capacitor plates bearing on adjustable abutments on said casing, said plates each having an extension protruding through the casing, said extensions threaded with a nut provided for drawing up each of said capacitor plates against said adjustable abutments, a second pair of O-rings provided between said casing and each of said capacitor plates for sealing of said chambers, said capacitor plates with said diaphragm as a common plate forming a double capacitor, a differential of pressures applied to said chambers on opposite sides of said diaphragm causing deflection of said diaphragm with a resultant change in relative capacity of each half of said double capacitor.

2. A differential pressure sensing unit consisting of a diaphragm, two O-rings engaging said diaphragm on opposite surfaces adjacent the periphery of said diaphragm, a casing in which said O-rings and said diaphragm are mounted, said casing having a T-shaped annular slot for holding said O-rings, said O-rings fitting in the wings of said T-shaped annular slot with said diaphragm extending through the stem of said T-shaped annular slot and clamped between said O-rings, said casing having pressure connections to permit application of pressures to chambers on opposite sides of said diaphragm, two capacitor plates, one on each side of said diaphragm, said capacitor plates having an adjusting means positioning said capacitor plates in said casing, a second pair of O-rings provided between said casing and each of said capacitor plates for sealing said chambers, a varying degree of compression in said second pair of O-rings dependent upon the position of said capacitor plates in said casing as positioned by said adjusting means, said second pair of O-rings cooperating with said capacitor plates between said pressure connections and said adjusting means, said capacitor plates with said diaphragm as a common plate forming a double capacitor, a differential of pressures applied to said chambers on opposite sides of said diaphragm causing deflection of said diaphragm with a resultant change in relative capacity of each half of said double capacitor.

References Cited in the file of this patent
UNITED STATES PATENTS

| | | |
|---|---|---|
| 1,356,156 | Kurman | Oct. 19, 1920 |
| 1,480,218 | Moore | Jan. 8, 1924 |
| 1,719,227 | King | July 2, 1929 |
| 2,092,762 | Kroger | Sept. 14, 1937 |
| 2,667,786 | Spaulding | Feb. 2, 1954 |